United States Patent Office 3,501,804
Patented Mar. 24, 1970

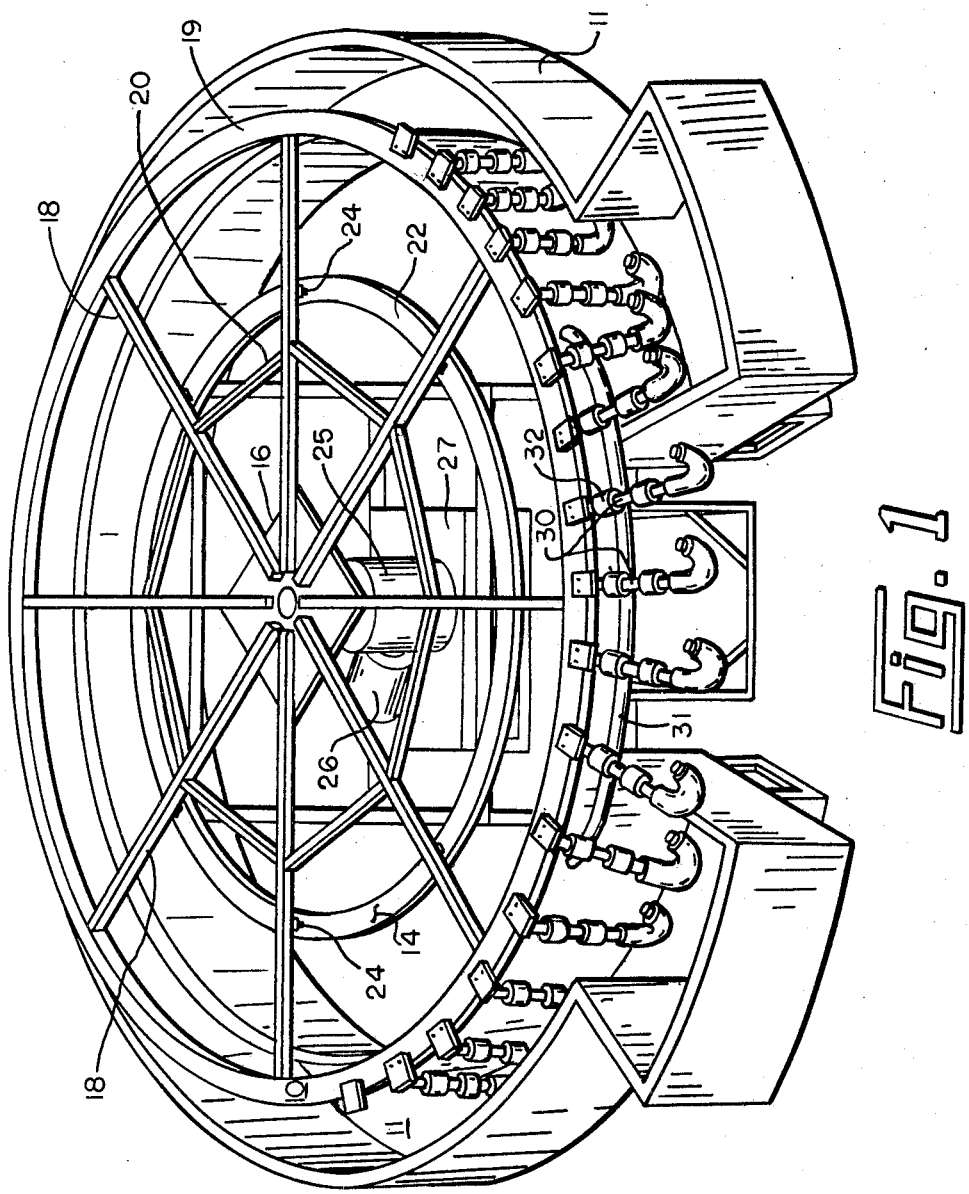

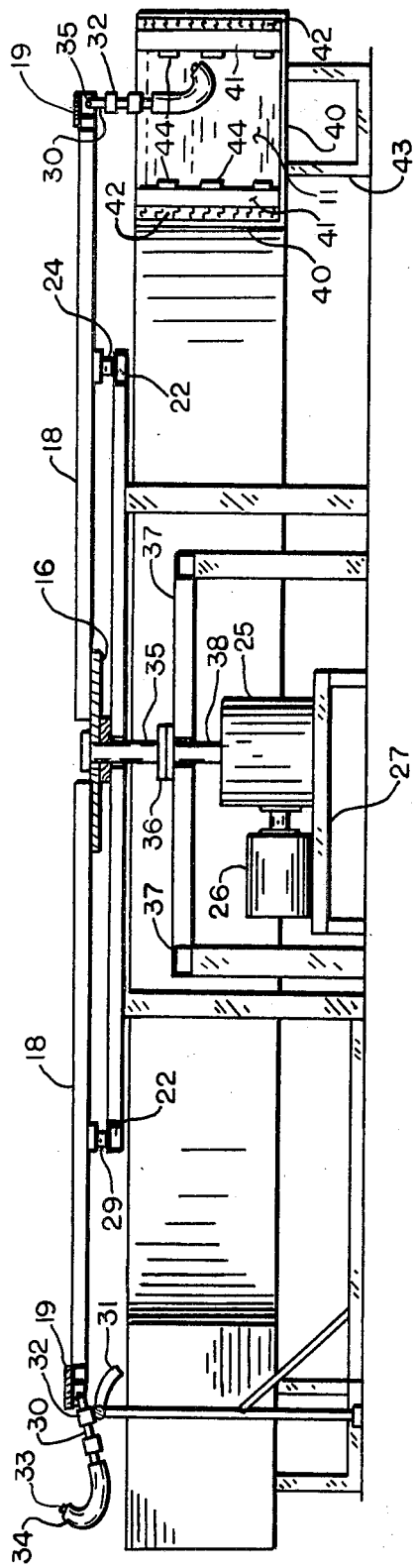

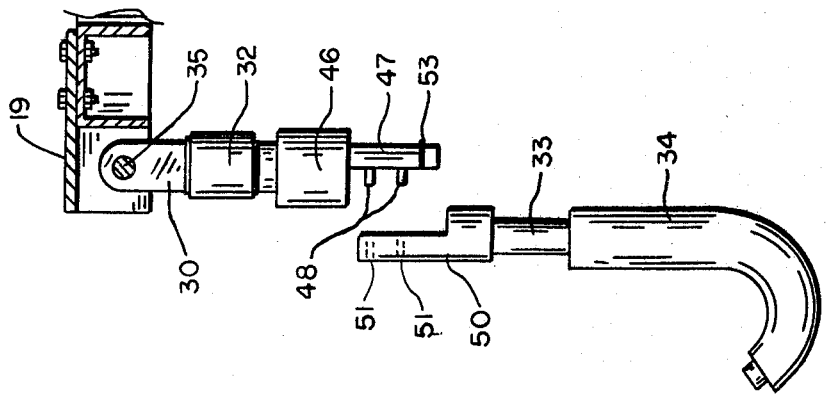
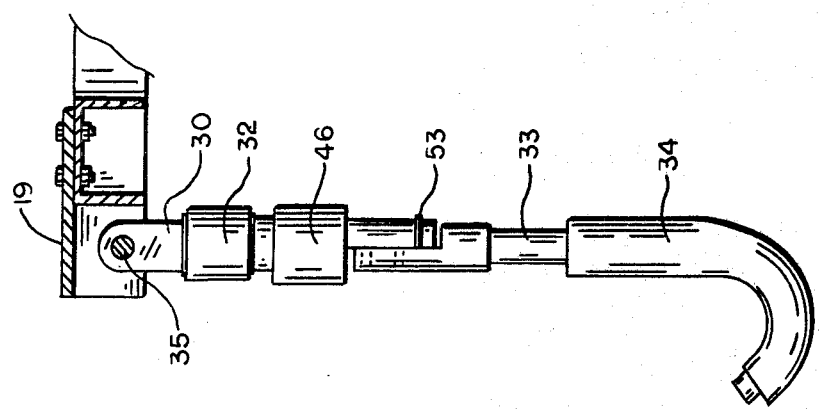
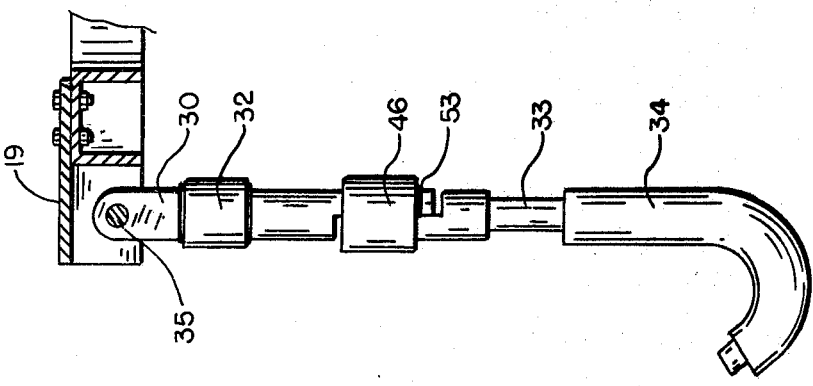

3,501,804
RUBBER CURING APPARATUS AND METHOD
Howard L. Oplinger, Chardon, and Alan Nicol, Burton, Ohio, assignors to Ball Brothers Company Incorporated, Muncie, Ind., a corporation of Indiana
Filed June 13, 1967, Ser. No. 645,695
Int. Cl. B29h 5/28; B29c 13/00
U.S. Cl. 18—6                                                    5 Claims

ABSTRACT OF THE DISCLOSURE

Apparatus and method for curing mandrel-mounted hoses by continuously moving the mandrels through a heated bath except for withdrawal at a loading station whereat the mandrels are positioned for removal and mounting of hoses thereon. A mounting means for mandrels is also included.

---

This invention relates to apparatus and method for continuously curing elastomeric articles. More particularly, this invention relates to apparatus and method for continuously curing mandrel-supported elastomeric articles in a heated bath.

Rubber articles having curves and other non-linear configurations, such as hoses for automotive or appliance use, are conventionally manufactured by forming cylindrical tubes by, for example, extrusion of uncured elastomer. Such uncured tubes are shaped by forcing them on a mandrel. Basically, the mandrel is a length of bar or tubing of a configuration generally conforming to the desired final shape of the hose. When tubing is heated to curing temperature, the elastomer cross links and assumes a shape substantially the same as that imposed by the mandrel. Of course the mandrel may be more severe in configuration than the desired final shape of the elastomer to anticipate and correct for changes in shape upon removal of the cured hose from the mandrel. By definition, an elastomer may be stretched to facilitate removal of the hose from the mandrel without inducing permanent deformation.

Curing of mandrel-mounted hoses is often accomplished by mounting a number of such mandrels on a rack, placing one or more racks in an autoclave and heating the entire assembly to curing temperatures on a batch basis. This approach often leads to inefficient labor utilization and/or quality control.

While an assembly is being heated in an autoclave, that particular batch does not require specific attention. However, upon loading and unloading of a batch, substantial attention and labor are required. Since the heating and curing of a given batch can consume a significant amount of time, it is not unusual to have one or more operators servicing a group of autoclaves. Thus by properly sequencing the loading and unloading, the operators can be active on a continuous basis. However, when some delay occurs at one autoclave, it is possible to be tardy in terminating the curing of hoses in other autoclaves. Thus quality can suffer as a result of the many variables in the sequenced-batch approach.

Quality may also suffer as a result of the lack of continuity between batches in a given autoclave and as a result of the lack of similarity between conditions in adjoining autoclaves. When a serious oversight occurs so as to visibly damage the articles being processed, an entire batch may be ruined before the problem is recognized. The results of fine adjustments in the operating parameters are not conveniently observable without subjecting an entire batch to the adjusted conditions.

It is, therefore, an object of the present invention to provide an apparatus and method which permit careful adjustment of operating parameters.

It is another object of the present invention to provide an apparatus and method which stabilize optimum operating conditions when attained.

Yet another object of the present invention is to provide apparatus which involves less manual effort and motion to accomplish curing of mandrel-mounted elastomeric articles.

Yet another object of the present invention is to provide an apparatus with a constant though diminished demand for operator attention and effort.

Other objects and advantages of the present invention will be apparent from the drawings and following description, and from the appended claims.

According to the present invention, a more convenient and efficient curing process is provided by a closed-loop carrying means disposed for the greater portion of its length over a heated bath. The preferred closed-loop carrying means is a rotatably mounted horizontal wheel. Other suitable closed-loop carrying means include a movably mounted continuous chain or belt. It will be appreciated by those skilled in the art that many closed-loop conveying means are available.

Positioned beneath the carrying means and extending for a major portion thereof is a bath. The bath is preferably a liquid at curing temperature though it may also be a fluidized-solids bath if desired. Low melting salts which are inert to rubber are preferred. At at least a minor portion of the area beneath the carrying means, the bath is discontinued. The discontinuity is a practical consideration rather than a necessity.

The carrying means incorporates spaced mandrel mounting means. Thus, mandrels can be mounted on the carrying means, and, when hanging therefrom, carried through the heated bath, thereby accomplishing curing of hoses mounted on the mandrels. Hoses can be easily slipped onto and removed from mounted mandrels with the aid of a lubricant such as a glycol. The carrying means includes a speed-adjusting means as part of the drive. Thus, dwell time in the bath can be regulated and the proper length of cure can be accomplished. The bath incorporates temperature adjusting means, which may be, for instance, a conventional thermostat or manually set rheostat and an electrical heater. Steam or other heating media may also be employed to adjust and maintain the temperature of the bath.

At the portion of the carrying means beneath which the bath is not necessarily disposed, mandrel withdrawing means moves the mandrel from the bath into a position for removal of the hose from the mandrel. While in this position, another hose may be quickly placed on the mandrel for curing. The mandrel may be withdrawn from the bath by an electrical solenoid with an appropriate switch activated by the mounting station, or by a hydraulic or pneumatic cylinder similarily activated by a switch. However, the preferable means comprises a pivoted mandrel mounting means which may rotate relative to the carrying means. When the station approaches the loading and unloading portion of the carrying means cycle, the mounting means strikes an inclined surface, such as a bar, and is urged from a hanging, or vertical position, to a horizontal position as the mounting means rides up upon the bar. Hoses may be conveniently mounted on the mandrel while the latter is in the horizontal position. Any of the well known rubber lubricants can, if desired, be used to facilitate mounting the hoses on the mandrels.

Other apparent desirable but not mandatory alterations may be made. For instance, the carrying means and bath may be enclosed by a hood, preferably insulated, except, of course, the loading and unloading portion must be open. An insulated hood would curtail heat loss, thereby improving both economy and working conditions.

The invention will be more readily understood with reference to the drawings in which:

FIGURE 1 is a perspective view of the preferred apparatus;

FIGURE 2 is a cross-sectional view of the same apparatus; and

FIGURES 3, 4, and 5 are detailed views of the preferred mandrel mounting means.

With reference to FIGURE 1, it will be noted that wheel 10, tank 11, and support 14, form distinct portions of the apparatus. Wheel 10 is formed of center plate 16, radial members 18, and outer rim 19. Internal bracing members 20 are disposed between and attached to radial members 18. Wheel structure 14 is basically carried on a thick, circular surface 22 and rides thereon by means of rollers 24 attached to radial members 18. Wheel assembly 14 is located on circular surface 22 by drive means 25 which is attached to center plate 16 and transmits torque thereto. Drive means 25 is connected to prime mover 26 which is usually an electrical motor. Both drive means 25 and prime mover 26 are located on support 27. Thus prime mover 26, which may be variable speed, transmits power through drive means 25, which may also be variable speed, and rotates center plate 16. Center plate 16, being an integral part of wheel assembly 10, thus rotates the wheel 10 which is primarily supported by means of rollers 24 bearing upon circular surface 22.

On the periphery of outer rim 19 are located a number of mandrel mounting means 30. Mandrel mounting means 30 usually hang vertically towards tank 11, but, at the loading and unloading position, are maintained in a substantially horizontal position by bar 31. Mandrel mounting means 30 include a bearing surface 32, which contacts bar 31 to move the mandrel mounting means 30 into the desired horizontal position.

The operation of bar 31 upon bearing surface 32 will be readily understood with reference to FIGURE 2. These members clearly move mandrel mounting means 30 into a substantially horizontal position. On the other hand, in the portions in which bar 31 is not disposed, mandrel mounting means 10 hang vertically into tank 11. Normally each mandrel mounting means 30 carries a mandrel 33 having thereon a hose 34. Mandrel mounting means 30 are mounted to rim 19 by means of pivot 35.

Other features apparent in FIGURE 2 include shaft 35 which is attached to center plate 16. Advantageously, shaft 35 is carried by a thrust bearing 36 supported by framework 37. This enables drive shaft 38 of movement transmitting means 25 to be splined into shaft 35 thereby relieving driving means 25 of thrust loadings. Of course thrust loadings can be directly accommodated by drive means 25 if appropriate bearing structure is provided. Other means for rotating wheel 10 will be apparent to those skilled in the art.

Tank 11 is normally formed of an outer shell 40, and inner side walls 41. Insulation 42 is advantageously positioned between outer shell 40 and inner side walls 41. The entire tank is carried upon support structure 43. Located upon inner side walls 41 are heating elements 44. Heating elements 44 may be electrical-resistant strips controlled by a thermostat or rheostat (not shown) or may be steam coils disposed within the tank. If elements 44 are electrical, conventional precautions should of course be taken if the bath is electrically conductive.

Mandrel mounting means 30 will be more fully understood with reference to FIGURES 3, 4, and 5. As seen in FIGURE 3, mandrel mounting means 30 is supported on outer rim 19 by pivot 35. Mandrel 33 is secured to mandrel mounting means 30 by sleeve 46. A stop 53 is provided to position sleeve 46 over the juncture between mounting means 30 and mandrel 33 until removal is desired. When removal is desired, sleeve 46 may be moved away from the connecting portions of mandrel mounting means 30 and mandrel 33, as shown in FIGURE 4. The lower portion of mandrel mounting means 30 is a half-round bar section 47 having thereon pins 48. The upper portion of mandrel 33 is similarly a half-round bar section 50 having therein holes 51 located to accommodate pins 48. Thus, as shown in FIGURE 5, mandrel 33 may be readily removed from mandrel mounting means 30 by withdrawing pins 48 from holes 51. Mandrels may be changed without slowing the apparatus.

From the above description and the drawings, it will be apparent that the apparatus and method of the instant invention provides for efficient and precise curing of mandrel mounted elastomer hoses. Temperature of the bath, and the temperature at which curing is accomplished, can be readily adjusted by varying the temperature of the heating elements. Length of cure can easily be controlled by adjusting the rotational speed of the wheel, thereby adjusting the hose dwell time in the bath. Therefore, time and temperature, the two most important conditions in curing elastomers, are both conveniently set in manners which permit holding of optimum conditions when obtained.

The method of the instant invention will be more clearly understood with reference to the following examples:

EXAMPLE I

A butadiene-styrene rubber composition of the following formula was compounded:

| | Lbs. |
|---|---|
| SBR (butadiene-styrene) rubber stock | 120 |
| Carbon black | 88 |
| Polymerized trimethyldihydroquinoline | 2.5 |
| Thermoflex A—a mixture of 25% di-p-methoxy diphenylamine, 25% diphenyl-p-phenylene diamine, and 50% phenyl beta-naphthylamine | 1.5 |
| Stearic acid | 1.5 |
| Zinc oxide | 5 |
| N-cyclohexyl-2-benzothiazole | 1 |
| Tetramethylthiuram disulfide | .8 |
| Sulfur | 1.75 |
| Calcium oxide | 4 |
| Processing oil | 1 |

After thorough admixing and working, the rubber composition was extruded at a temperature below the curing range, i.e. at about a temperature of 225° F., to form a substantially linear hose of uncured material. A mandrel formed from solid tubing and bent to the desired shape was lubricated with ethylene glycol and the uncured hose slipped onto the mandrel. After such mounting on the mandrel, the hose and mandrel were submerged in a salt bath of sodium nitrate, sodium nitrite, and potassium nitrite, maintained at a temperature of about 360° F. The mandrel and hose were carried through the bath in about 10 minutes and then removed therefrom. The hose, which was found to be fully cured, was easily stripped from the severely shaped mandrel without damage or permanent deformation from the desired shape. The cured hose was found to be satisfactory in every respect in any way pertaining to the curing operation or salt bath.

EXAMPLE II

The operation of Example I was repeated using the following rubber formulation:

| | Lbs. |
|---|---|
| Neoprene (chloroprene) rubber stock | 70 |
| SBR (butadiene-styrene) rubber | 45 |
| Carbon black | 200 |
| Thermoflex A—a mixture of 25% di-p-methoxy diphenylamine, 25% diphenyl-p-phenylene diamine, and 50% phenyl beta-napthyl-amine | 1 |
| Phenyl-alpha-naphthyl-amine | 1 |
| Stearic acid | 1.5 |
| Process oil | 14 |
| Calcium oxide | 4 |
| Magnesium oxide | 4 |
| Zinc oxide | 5 |
| Sulfur | 1 |
| Tetramethylthiuram monosulfide | 1.5 |
| 2-mercaptoimidazoline | .5 |
| Butyl oleate | 10 |

The results with this composition were as satisfactory as that obtained with the composition of Example I.

EXAMPLE III

The operation of Example I was repeated using the following rubber formulation:

|   | Lbs. |
|---|---|
| EPT rubber stock | 200 |
| Carbon black | 145 |
| Calcium oxide | 8 |
| Zinc oxide | 5 |
| Process oil | 4 |
| Sulfur | 2 |
| Tetramethylthiuram disulfide | 1 |
| Tellurium diethyl dithiocarbamate | 1.5 |
| Mercapto-benzothiazole | 2 |
| Methyl zimate | .75 |

Again the results were entirely satisfactory.

As can be seen from the above examples, the method of the instant invention is useful with many elastomer compositions. Curing time can be altered from 1 minute to 15 minutes, preferably between 5 and 12 minutes, and cure temperature can advantageously be between about 300° F. to 450° F., and preferably between 350° F. and 425° F. However, since various rubber compositions can often be compounded to conform to a given cure time and temperature, it has been found desirable to standardize the wheel speed and bath temperature. By this approach various mandrels may be mounted in groups and hoses of differing shapes and formulation may be cured concurrently.

The laborsaving characteristics of the method are believed to be obvious. Perhaps as important as the laborsaving aspects, is the constant but undemanding attention requirement. Unsatisfactory curing is promptly recognizable and may be rectified with a minimum of waste.

While the apparatus has been described in detail for purposes of illustration, those skilled in the art will readily recognize numerous modifications and variations which preserve the advantageous characteristics of the specifically described apparatus. Therefore, the scope of the invention is not to be bounded by specific illustration but only by the following claims.

What is claimed is:

1. Apparatus for curing mandrel-mounted elastomeric articles comprising a horizontal wheel, means for rotatably supporting said wheel, drive means to rotate said wheel, a plurality of mandrels, means for pivotally mounting said mandrels on the rim of the horizontal wheel so that said mandrels normally hang vertically, guide means beneath a portion of the rim of the wheel for engaging said mandrels upon rotation of the wheel and causing the mandrels to pivot upwardly and outwardly from the wheel, and downwardly and inwardly to the hanging position from the rim of the wheel, and an arcuate, trough-like container for receiving a curing bath, said container being disposed beneath at least a portion of the rim of said wheel so that said mandrels in the vertically hanging position are suspended in the bath, said container having enlarged portions substantially adjacent one to the other where the mandrels are caused to pivot to and from the vertically hanging position so that said mandrels may be freely pivoted without interference from the container and drippings from the mandrel recovered in the container when the mandrels are pivoted upwardly and removed from said bath.

2. The curing apparatus as defined in claim 1 further including adjustable means for controlling the temperature of the curing bath in said arcuate, trough-like container.

3. The curing apparatus as defined in claim 1 further including adjustable means for controlling the speed of said drive means, whereby the period of immersion of the mandrel-mounted articles in the curing bath received in said arcuate, trough-like container may be readily varied to optimize curing of the articles.

4. The curing apparatus as defined in claim 1 wherein the means for rotatably supporting said wheel include a stationary support carrying a circular, substantially flat, horizontal track having on the top portion a bearing surface, and rollers mounted on said wheel and bearing upon said circular bearing surface to support said wheel.

5. The curing apparatus as defined in claim 1 wherein the bath includes at least one molten salt and further comprising temperature control means including electrical-resistance heating elements in said molten salt bath.

References Cited

UNITED STATES PATENTS

| | | | |
|---|---|---|---|
| 38,369 | 5/1863 | Bagnell. | |
| 1,965,824 | 7/1934 | Clayton. | |
| 2,041,788 | 5/1936 | Sprunger | 18—24 |
| 2,260,854 | 10/1941 | Killian | 18—24 |
| 2,333,143 | 11/1943 | Bennett. | |
| 2,353,256 | 7/1944 | Maywold | 18—24 XR |
| 2,482,418 | 9/1949 | Jenkins. | |
| 2,827,663 | 3/1958 | Flomp | 18—24 |
| 2,971,221 | 1/1961 | Schoenberk. | |
| 3,022,540 | 12/1962 | Shopero | 18—24 |
| 3,165,784 | 1/1965 | Becker | 18—24 |
| 3,166,791 | 1/1965 | Miller et al. | |

WILLIAM J. STEPHENSON, Primary Examiner

U.S. Cl. X.R.

18—24